US009451380B2

(12) United States Patent
Inou et al.

(10) Patent No.: US 9,451,380 B2
(45) Date of Patent: Sep. 20, 2016

(54) APPARATUS AND METHOD FOR LOCALIZING SOUND IMAGE FOR VEHICLE'S DRIVER

(71) Applicant: DENSO CORPORATION, Kariya, Aichi-pref. (JP)

(72) Inventors: Hiroshi Inou, Anjo (JP); Seiji Totsuka, Tokai (JP); Kenji Kudou, Kariya (JP)

(73) Assignee: DENSO CORPORATION, Kariya (JP)

( * ) Notice: Subject to any disclaimer, the term of this patent is extended or adjusted under 35 U.S.C. 154(b) by 429 days.

(21) Appl. No.: 13/944,925

(22) Filed: Jul. 18, 2013

(65) Prior Publication Data
US 2014/0023211 A1    Jan. 23, 2014

(30) Foreign Application Priority Data
Jul. 19, 2012    (JP) ................. 2012-160640

(51) Int. Cl.
*H04S 7/00* (2006.01)
*B60Q 9/00* (2006.01)
(52) U.S. Cl.
CPC .............. *H04S 7/303* (2013.01); *B60Q 9/00* (2013.01); *H04R 2499/13* (2013.01); *H04S 2400/11* (2013.01)
(58) Field of Classification Search
CPC .............. H04S 2400/11; H04S 7/303; H04R 2499/13; B60Q 9/00; B60Q 9/008; B60W 50/14; B60W 30/08; B60W 10/20; B60W 30/10; B60W 10/22; G01S 13/931; G01S 2013/9357; G01S 2013/9332; G08G 1/166
USPC ............. 381/302, 310; 340/435–437, 425.5, 340/460; 701/1, 400, 409–412, 416, 421, 701/428, 441; 180/167, 169
See application file for complete search history.

(56) References Cited

U.S. PATENT DOCUMENTS

| 5,450,057 | A | 9/1995 | Watanabe |
| 7,274,288 | B2 | 9/2007 | Nagata |
| 8,384,532 | B2 * | 2/2013 | Szczerba ............... G01S 13/723 340/435 |
| 2004/0150514 | A1 * | 8/2004 | Newman ............... B60Q 9/008 340/435 |
| 2004/0200662 | A1 | 10/2004 | Tajima et al. |
| 2005/0270146 | A1 | 12/2005 | Enya et al. |
| 2006/0001532 | A1 | 1/2006 | Nagata |
| 2006/0017548 | A1 * | 1/2006 | Ozaki ................... B60Q 1/085 340/425.5 |

(Continued)

FOREIGN PATENT DOCUMENTS

| CN | 101644932 A | 2/2010 |
| DE | 198 01 205 A1 | 7/1998 |

(Continued)

OTHER PUBLICATIONS

Fletcher et al, "Correlating driver gaze with the road scene for driver assistance systems", May 24, 2005.*

(Continued)

*Primary Examiner* — David Ton
(74) *Attorney, Agent, or Firm* — Posz Law Group, PLC

(57) ABSTRACT

An acoustic apparatus mounted on a vehicle driven by a driver includes: acquiring unit for acquiring a gaze point at which the driver gazes while driving the vehicle, reflecting parameters including a location of the vehicle, a running state of the vehicle and a running environment of the vehicle; generation unit for generating a sound image in the vehicle; and localization unit for localizing the sound image to be at the gaze point.

11 Claims, 10 Drawing Sheets

(56) References Cited

U.S. PATENT DOCUMENTS

| | | |
|---|---|---|
| 2009/0237269 A1 | 9/2009 | Okugi et al. |
| 2009/0316939 A1 | 12/2009 | Matsumoto et al. |
| 2010/0036563 A1 | 2/2010 | Inou et al. |
| 2010/0060441 A1* | 3/2010 | Iwamoto ............... B60W 50/14 340/435 |
| 2010/0253489 A1* | 10/2010 | Cui ....................... G01S 13/723 340/425.5 |

FOREIGN PATENT DOCUMENTS

| | | |
|---|---|---|
| EP | 1 033 557 A2 | 9/2000 |
| EP | 2 154 593 A2 | 2/2010 |
| JP | 05-126948 A | 5/1993 |
| JP | H09-7100 A | 1/1997 |
| JP | 2002-373399 A | 12/2002 |
| JP | 2004-217114 A | 8/2004 |
| JP | 2005-242482 A | 9/2005 |
| JP | 2005-329754 A | 12/2005 |
| JP | 2006-019908 A | 1/2006 |
| JP | 2008-084219 A | 4/2008 |
| JP | 2008-129734 A | 6/2008 |
| JP | 2009-231938 A | 10/2009 |
| JP | 2010-004361 A | 1/2010 |
| JP | 2010-36777 A | 2/2010 |
| JP | 2010-122997 A | 6/2010 |
| WO | 02096718 A1 | 12/2002 |

OTHER PUBLICATIONS

Ishikawa et al, "Passive driver gaze tracking with active appearance models", 2004.*

Office Action mailed May 7, 2014 issued in corresponding JP patent application No. 2012-160640 (and English translation).

Masaichi Kondo. "Basic Automotive Engineering." Apr. 20, 1967. pp. 232-233. Published by Yokendo Co., Ltd. (with English spot translation).

An Extended European Search Report dated Oct. 9, 2013 in the corresponding EP application No. 13176317.9-1810.

Office Action issued Dec. 15, 2015 in the corresponding CN application No. 201310306224.0 (with English Translation).

* cited by examiner

APPARATUS AND METHOD FOR LOCALIZING SOUND IMAGE FOR VEHICLE'S DRIVER

CROSS REFERENCE TO RELATED APPLICATION

This application is based on and claims the benefit of priority from earlier Japanese Patent Application No. 2012-160640 filed on Jul. 19, 2012 the description of which is incorporated herein by reference.

BACKGROUND

1. Technical Field

The present disclosure relates to an apparatus and a method for localizing a sound image for vehicle's driver.

2. Description of the Related Art

Conventionally, as a vehicle control, a technique that avoids a lane departure when the vehicle is going to depart from the traffic lane has been proposed. For example, Japanese Patent Number 3945488 discloses a technique that detects whether or not the own vehicle is likely to depart from the traffic lane based on an estimation value in which an amount of lane-departure is estimated at a gaze point which is set in front of the vehicle with a gaze distance determined based on the running speed of the vehicle.

Regarding the technique in the above-described patent document, when any dangers concerning the own vehicle such as lane-departure takes place, it is possible to detect the danger and warn the driver after the danger took place. However, according to the technique of the patent document, the driver cannot be warned in advance, to drive the vehicle so as to prevent occurrence of dangers.

SUMMARY

The embodiment provides an on-vehicle acoustic apparatus and a program executed in the on-vehicle acoustic apparatus, which appropriately leads the driving operation operated by the driver.

According to the present disclosure, an acoustic apparatus mounted on a vehicle driven by a driver includes: acquiring means for acquiring a gaze point at which the driver gazes while driving the vehicle, the gaze point reflecting parameters including a location of the vehicle, a running state of the vehicle and a running environment of the vehicle; generation means for generating a sound image in the vehicle; and localization means for localizing the sound image to be at the gaze point.

The acoustic apparatus mounted on the vehicle according to the present disclosure controls the sound image in the passenger compartment to be localized at the gaze point (In other words, the driver feels as if the sound came from the direction of the gaze point with a distance away therefrom). Generally, since persons including the driver pays attention instinctively to the direction where the sound is coming from, the driver pays attention to the direction towards the gaze point when the acoustic apparatus is employed. As a result, the observation point of the driver can be led to an appropriate direction when driving the own vehicle.

DETAILED DESCRIPTION OF THE PREFERRED EMBODIMENTS

With reference to the drawings, embodiments according to the present disclosure are described as follows.

First Embodiment

Figure 1:
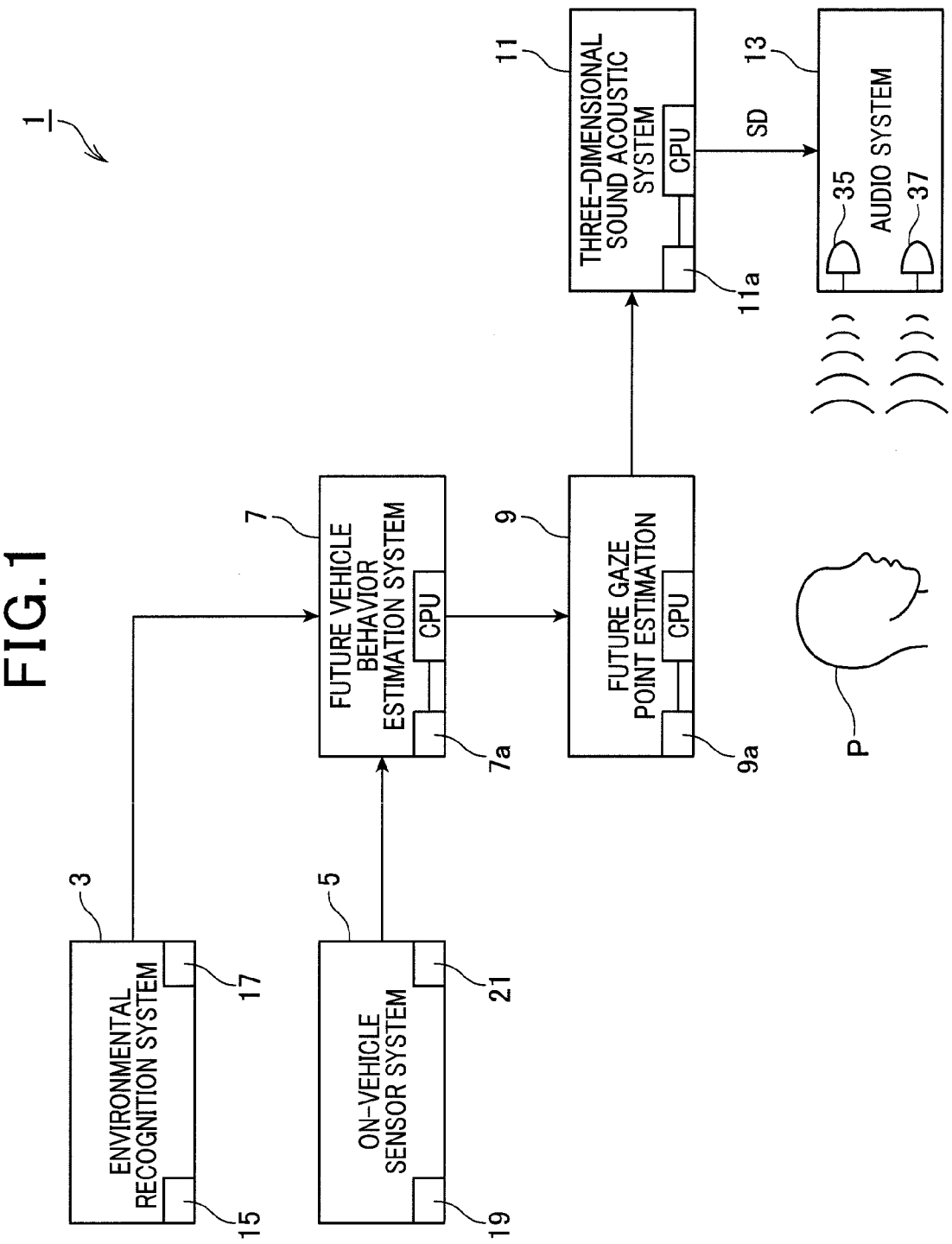
FIG. 1 is a block diagram showing an overall configuration of an on-vehicle acoustic apparatus.
Figure 2:
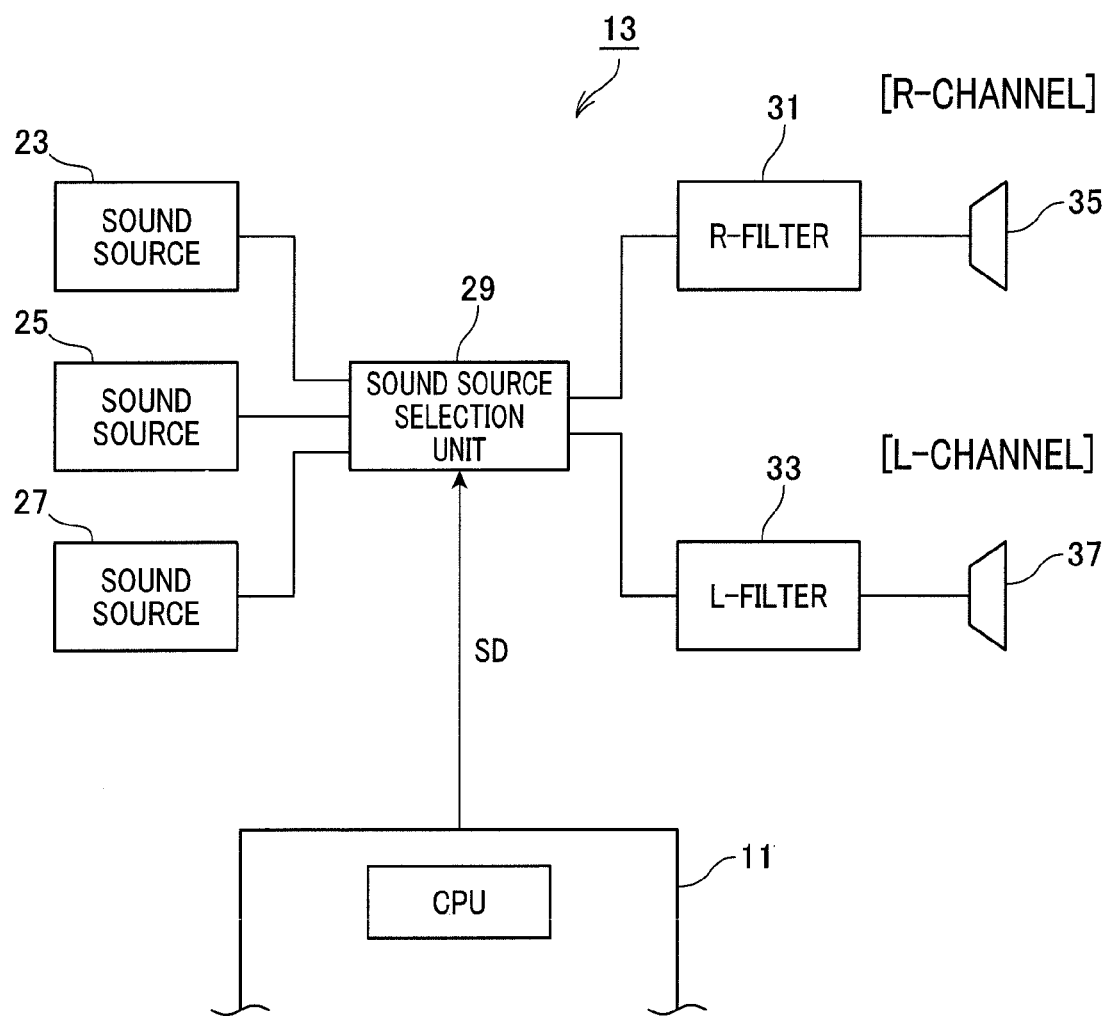
FIG. 2 is a block diagram showing a configuration of an audio system.

With reference to FIGS. 1 and 2, hereinafter is described a configuration of the on-vehicle acoustic apparatus 1 (acoustic apparatus). The on-vehicle acoustic apparatus 1 is an on-vehicle system which is mounted on a vehicle (hereinafter referred to own vehicle). The on-vehicle acoustic apparatus 1 includes an environmental recognition system 3, an on-vehicle sensor system 5, a future vehicle behavior estimation system 7 (first estimator), a future gaze point estimation system (acquiring means, second estimator) 9, a three-dimensional sound acoustic system (localization means, audio processor) 11, an audio system (localization means, generation means, audio system) 13.

The environmental recognition system 3 (recognition device) includes well-known navigation system 15, a camera 17 capable of taking images around the own vehicle. The navigation system 15 includes map information (including road information) and GPS (Global Positioning System) function so that the location of the own vehicle on the road can be identified.

The on-vehicle sensor system 5 (sensor device) includes a wheel speed sensor 19, a gyro sensor 21. Therefore, the on-vehicle sensor system 5 can detect running speed V of the own vehicle by using the wheel speed sensor 19 and yaw rate y of the own vehicle by using the gyro sensor 21.

The future vehicle behavior estimation system 7 (first estimator), the future gaze point estimation system 9 (second estimator) and the three-dimensional sound acoustic system 11 (audio processor) are constituted by well-known computers (CPU: central processing unit and its peripheral circuits) and execute a processing (i.e., computer program) which is described later. The future vehicle behavior estimation system 7, the future gaze point estimation system 9 and the three-dimensional sound acoustic system 11 includes a memory unit 7a, a memory unit 9a and a memory unit 11a respectively and the computer program that executes the processing described later is stored in these memory units.

As shown in FIG. 2. the audio system 13 includes a plurality of sound source 23, 25 and 27, a sound source selection unit (selecting means) 29, a right channel filter (R-filter) 31, a left-channel filter (L-filter) 33, a right-channel speaker (R-speaker) 35 and a left-channel speaker (L-speaker) 37. The audio system 13 operates in response to sound data, SD, transmitted from the three-dimensional sound acoustic system 11.

The sound source selection unit 29 selects one sound source used for sound image generation from among the plurality of sound sources 23, 25 and 27 in response to an operation by the user. The R-filter 31 performs filtering on the sound source data of the sound source selected by the sound source selection unit 29, based on a transfer function. The sound source data after the filtering is outputted to the R-speaker 35. The L-filter 33 performs filtering on the sound source data of the sound source selected by the sound source selection unit 29, based on a transfer function. The sound source data after the filtering is outputted to the L-speaker 37. It is noted that the sound image is a virtual sound source where the human ears sense the sound with a distance and a direction thereof. The location of the sound image can be controlled by using a well-known method (sound image localization which is described later). Specifically, as shown in FIG. 1, the driver P recognizes the sound image based on the sound transmitted from the R-speaker 35 and the L-speaker 37.

The transfer functions at the L-filter 33 and the R-speaker 35 can be determined with a method which is described later. These transfer functions are used for a well-known technique, sound image localization. Specifically, the sound image localization is a Head-Related Transfer Function (i.e., HRTF) which represents transfer characteristics of sound transferred from the virtual source (according to the present disclosure, gaze point (described later) is employed) to the tympanum of the listener. The R-filter 31 and the L-filter 33 performs an inverse filtering process based on the transaural method to drive the speaker output.

R-speaker 35 and L-speaker 37 are disposed at the right side of the driver's seat and the left side of the driver's seat in the passenger compartment respectively. The sound image generated by the R-speaker 35 and the L-speaker 37 is localized to a gaze point by using a transfer function corresponding to the gaze point which is described later. In other words, the driver feels the sound image as if the sound is coming from the direction towards the gaze point with a distance therebetween.

Figure 3:
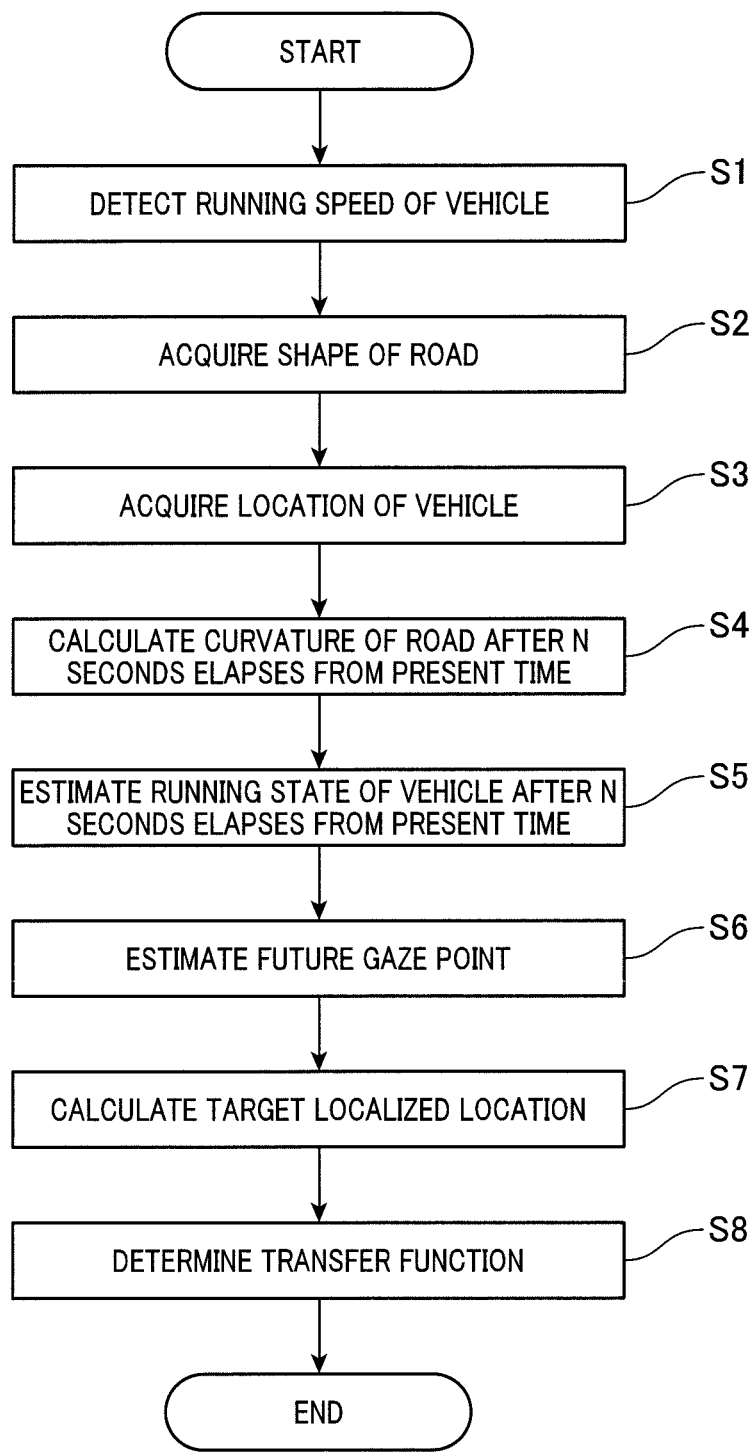
FIG. 3 is a flowchart showing a processing executed by the on-vehicle acoustic apparatus.

With reference to FIGS. 3 to 7, processing executed by the on-vehicle acoustic apparatus 1 is described as follows. The on-vehicle acoustic apparatus 1 repeatedly executes the processing with a predetermined period. At the step 1 as shown in FIG. 3, the on-vehicle sensor system 5 detects the running speed V of the own vehicle by using the wheel speed sensor 19.

At step 2, the environmental recognition system 3 acquires the shape of the road in front of the own vehicle by using the navigation system 15. At step 3, the environmental recognition system 3 acquires the location of the own vehicle (location of the own vehicle on the road of which shape is acquired at the step 2) by using the navigation system 15.

At step 4, the future vehicle behavior estimation system 7 calculates a curvature of the road at which the own vehicle is running after N seconds (N is real number larger than 0) elapsed from the present time. In other words, the future vehicle behavior estimation system 7 calculates by using the location of the own vehicle acquired at the step 3, the location of the own vehicle on the road of which shape is acquired at the step 2 at a time after the own vehicle runs for N seconds at the running speed V acquired at the step 1 and calculates the curvature of the road at the calculated location. The curvature of the road is one of examples of the running environment of the vehicle.

At step 5, the future vehicle behavior estimation system 7 estimates the running state of the own vehicle (running speed V, yaw rate y) after N seconds elapse from the present time by using the curvature calculated at the step 4. It is assumed that the running speed of the vehicle after N seconds elapsed from the present time is the same as the running speed at the present time. The yaw rate y at a time N seconds after the present time is produced by using the calculated curvature and the running speed V as described above. At step 6, the future gaze point estimation system 9 estimates the gaze point after N seconds elapsed from the present time (i.e., future gaze point). It is noted that the gaze point can be calculated by a method disclosed by Japanese Patent No. 4735676. Specifically, the gaze point can be estimated as follows.

Figure 4:
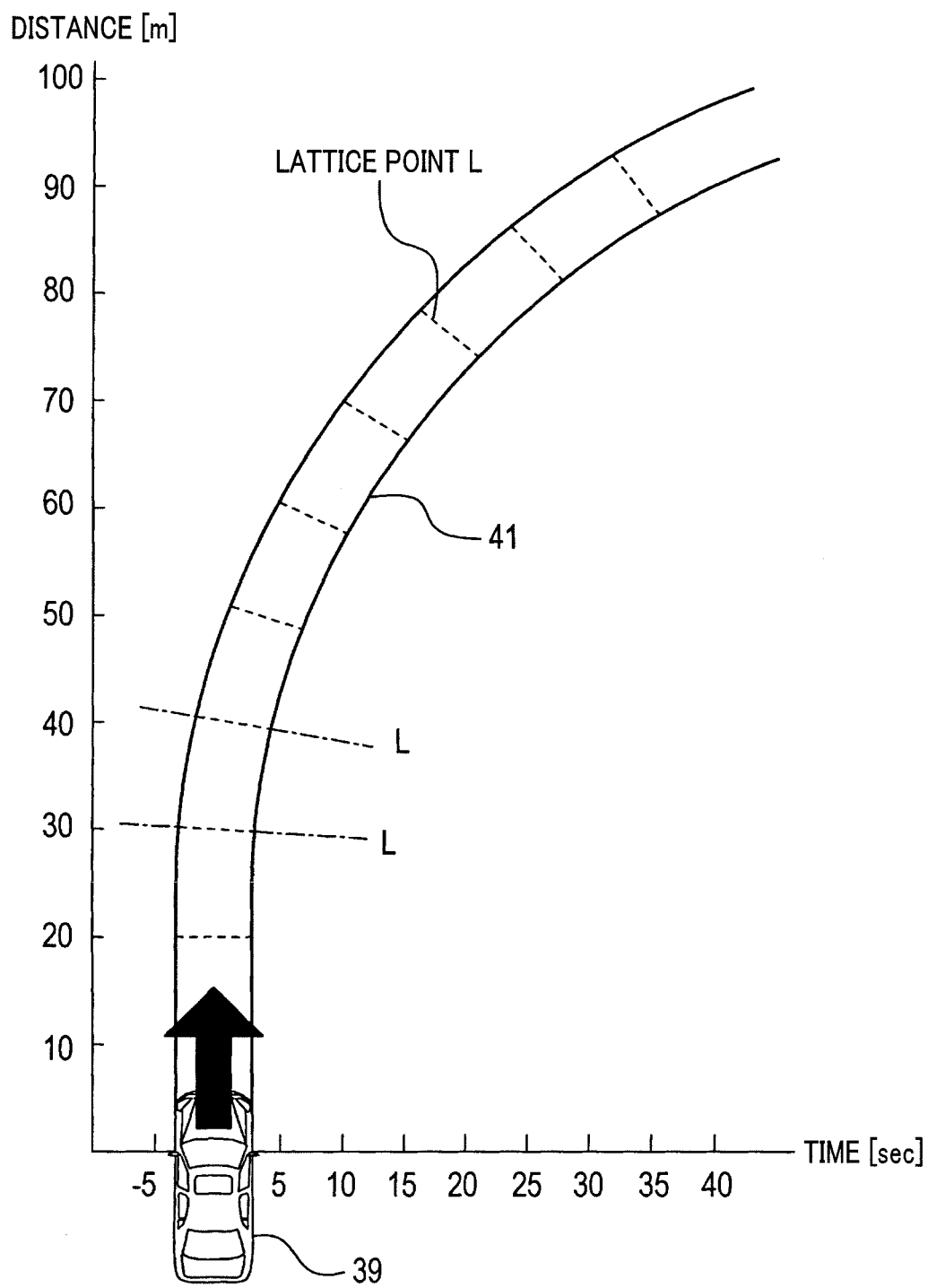
FIG. 4 is an explanatory diagram showing a lattice point L defined on the road 41 ahead of the own vehicle.

First, as shown in FIG. 4, the future gaze point estimation system 9 virtually sets a plurality of lattice points L after N seconds from the present time, with constant intervals on the road 41 ahead of the own vehicle 39 and acquires locations of the respective lattice points L and distances with respect to the location of the own vehicle 39 at a time after N seconds from the present time. The locations of the respective lattice points L and the distances can be acquired by using the map information included in the navigation system 15.

Figure 5:
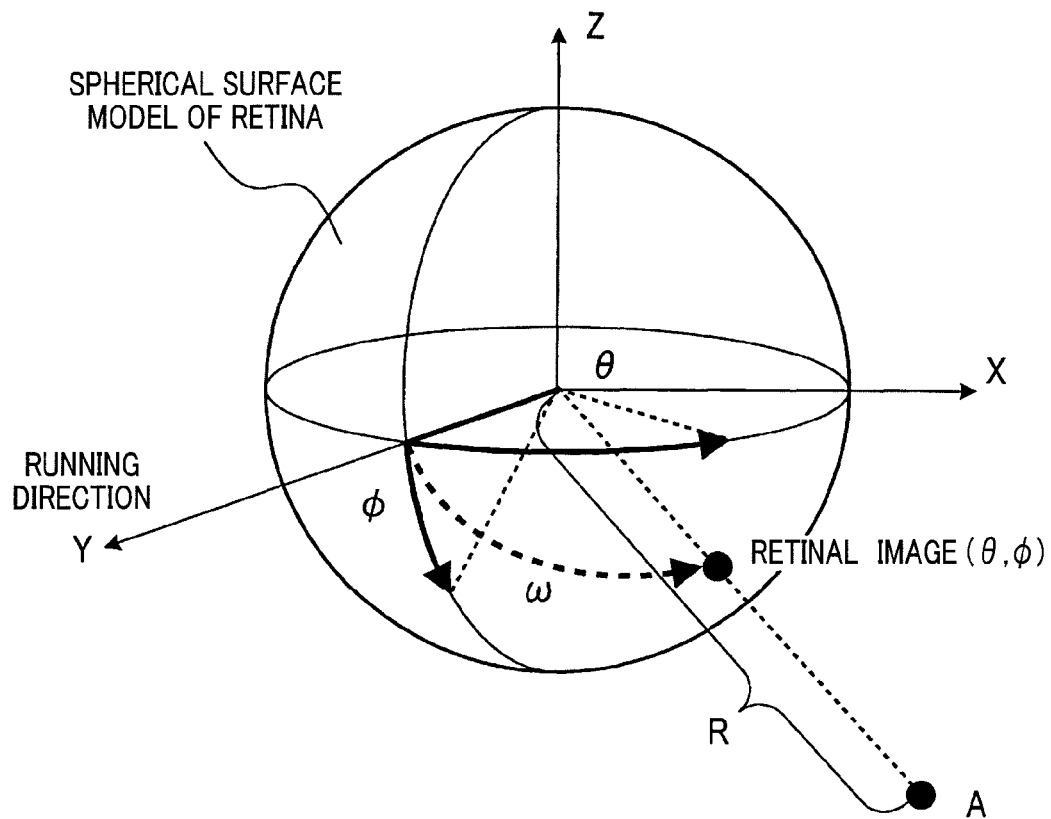
FIG. 5 is an explanatory diagram showing a spherical surface model of the retina.

Next, the process estimates a change rate A of a head-rotation-angle of the driver at a time when the N seconds laps from the present time. The head-rotation-angle is defined as an angle of the motion of the driver's head in the horizontal direction. The change rate A of the head-rotation-angle can be estimated from the curvature of the road calculated at the above-described step 4. Subsequently, with respect to the own vehicle 39 at a time N seconds from the present time, momentum of the respective lattice points L (hereinafter referred to visual momentum) is calculated when the respective lattice points L are mapped onto the spherical surface model of the retina. FIG. 5 is a diagram showing a spherical surface model of the retina. The spherical surface model of the retina is that the retina of the driver is modeled as a spherical surface and the position of an object on the spherical surface model of the retina corresponds to a position of the object in the coordinate of the retina (retina coordinate).

Assuming the azimuth of the object is $\theta$ and the angle of elevation is $\phi$, location of any one of lattice points L on the spherical surface model of the retina with respect to the own vehicle at a time N seconds from the present time is represented as $(\theta, \phi)$. Then, the process calculates an absolute value of a change rate of an eccentric angle $\omega$ (eccentric angle change rate) to be the visual momentum. The eccentric angle change rate is represented as the following equation where running speed of vehicle is V, distance to the lattice point L is R, yaw rate is y and the change rate of the head-rotation-angle is A. The running speed of the vehicle V used in the equation and the yaw rate y are values estimated at the above-described step 5. Also, the change rate of the head-rotation-angle A used in the following equation is a change rate of the head-rotation-angle at a time N seconds later than the present time.

$$\omega = \frac{V}{R} \cdot \sqrt{1 - \cos^2\theta \cdot \cos^2\phi} + \frac{\sin\theta \cdot \cos\phi}{\sqrt{1 - \cos^2\theta \cdot \cos^2\phi}} (\gamma + A)$$

Figure 6:
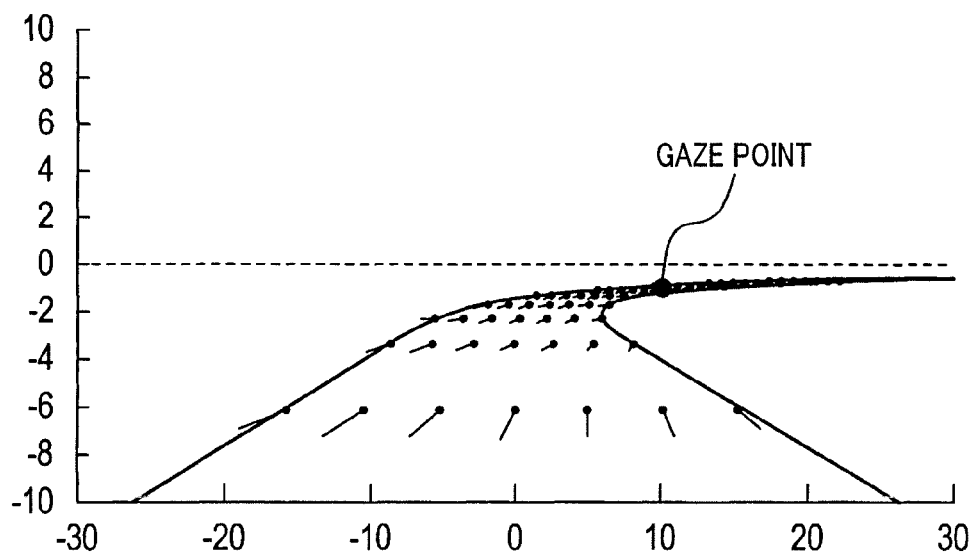
FIG. 6 is an explanatory diagram showing an example of the gaze point.
Figure 7:
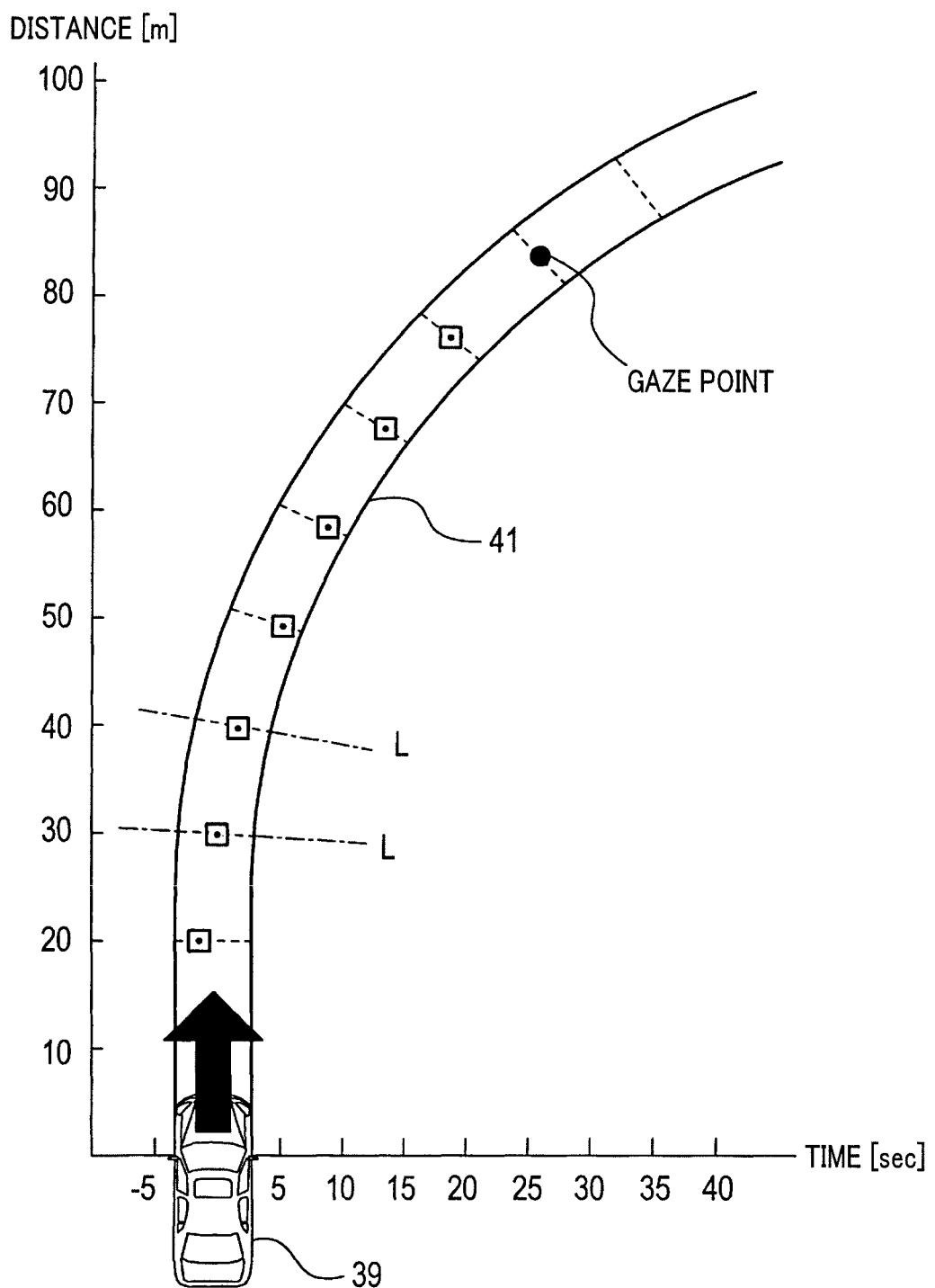
FIG. 7 is an explanatory diagram showing an example of the gaze point.

The gaze point at a time N seconds from the present time is defined such that the change rate of an eccentric angle regarding the respective lattice points L are calculated and the lattice point L of which absolute value of the change rate of the eccentric angle becomes minimum is set as the gaze point at a time N seconds from the present time. For example, the gaze point is illustrated in FIGS. 6 to 7. Since the change rate of the eccentric angle is calculated by using the spherical surface model of the retina, the change rate of the eccentric angle indicates visual momentum of the lattice point L on the road. Also, it is apparent psychologically and empirically that the driver tends to look at the minimum point of the visual momentum while driving the own vehicle. Further, it is estimated that the driver looks somewhere on the road when driving the own vehicle. Therefore, the lattice point L of which the absolute value of the change rate of the eccentric angle (visual momentum) becomes a minimum is set as the gaze point.

The above-described gaze point is estimated based on parameters at a time N seconds from the present time including the location of the own vehicle 39, the running state of the own vehicle (running speed V, yaw rate y) and the running environment of the vehicle (the curvature of the road). In other words, these parameters including the location, the running state and the running environment are reflected to the gaze point. At step 7, the future gaze point estimation system 9 converts, the location of the gaze point at a time N seconds from the present time acquired at the step 6, to be a location with respect to the three dimensional orthogonal coordinate system. The converted location with respect to the three dimensional orthogonal coordinate system is defined as a target localized location. The gaze point and the target localization location are different in the coordinate system, however, the location themselves are identical.

At step 8, the three-dimensional sound acoustic system 11 determines a transfer function used for the R-filter 31 and a transfer function used for L-filter 33 in response to the target localized location acquired at the step 7. The audio system 13 stores in advance a plurality of transfer functions each corresponding to respective target localized locations and selects a transfer function based on the target localized location acquired at the step 7.

The sound image generated by the audio system 13 by using the transfer function determined by the step 8 localizes to the target localized location acquired at the step 7. In other words, the driver feels as if the sound generated by the audio system 13 came from the direction towards the target localized location with a distance away therefrom. The sound image can be generated continuously while the vehicle is driven by the driver or, can be generated when a predetermined condition is met. It is noted that the audio system 13 preferably generates the sound image before N seconds elapses from the present time.

The advantages of the on-vehicle acoustic apparatus 1 are described as follows.
(1) The on-vehicle acoustic apparatus 1 controls the sound image in the passenger compartment to be localized at the gaze point (In other words, the driver feel as if the sound came from the direction towards the gaze point with a distance away therefrom). Generally, since persons including the driver pay attention instinctively to the direction where the sound is coming from, the driver pays attention to the direction towards the gaze point when the on-vehicle acoustic apparatus 1 is employed. As a result, observation point of the driver can be led to an appropriate direction when driving the own vehicle.
(2) The on-vehicle acoustic apparatus 1 controls the sound image to be localized to a future gaze point (gaze point after N seconds elapses from the present time). Hence, the observation point of the driver can be led in advance to a direction to be recognized in the future. Assuming the on-vehicle acoustic apparatus 1 estimates the gaze point so that a time lag occurs in the processing for sound image to be localized to the gaze point, the time lag can be cancelled.
(3) In the on-vehicle acoustic apparatus 1, the user can select sound source among a plurality of sound sources whereby user's observation point can be led to an appropriate direction effectively.

Figure 8:
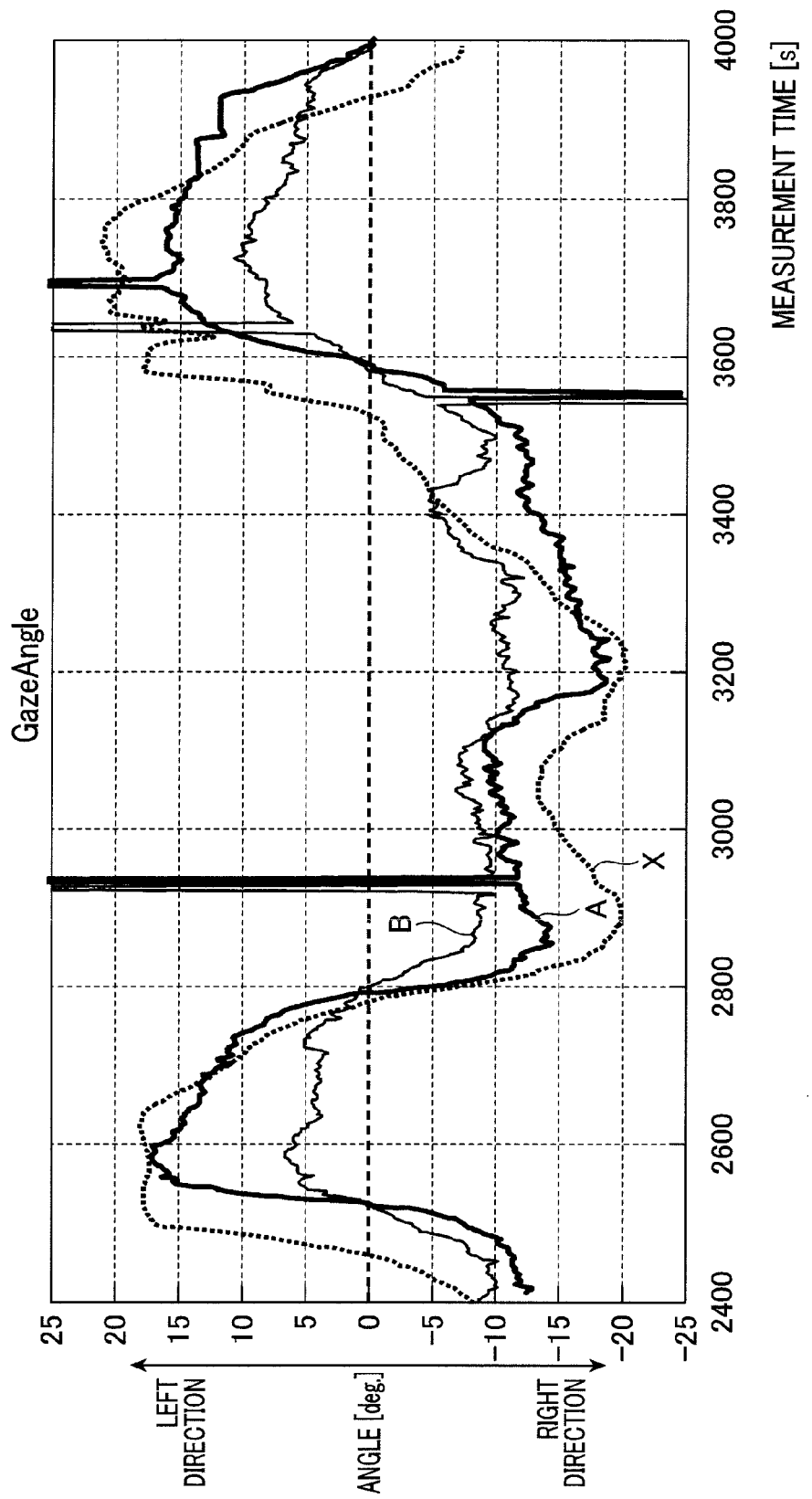
FIG. 8 is a graph showing an experiment result concerning a direction of the observation point of the driver.

The followings are a confirmation test for advantages of the on-vehicle acoustic apparatus 1.
(1) Method for the Confirmation Test The same driver drives the own vehicle in the same test course with/without the on-vehicle acoustic apparatus 1 and the direction of the observation point of the driver is continuously measured. Moreover, an acceleration factor at longitudinal direction of the own vehicle and an acceleration factor at crosswise direction of the own vehicle are continuously measured.
(2) Test Result FIG. 8 is a graph showing a change in a direction of the observation point of the driver while driving the own vehicle. The vertical axis of FIG. 8 represents a direction (angle) of the observation point of the driver when the exact front direction of the own vehicle is defined as 0 degree and the horizontal axis of FIG. 8 represents the measurement time. The A curve represents a change in a direction of the observation point of the driver when the on-vehicle acoustic apparatus 1 is mounted on the own vehicle. The B curve represents a change in a direction of the observation point of the driver when the on-vehicle acoustic apparatus 1 is not mounted on the own vehicle. The X curve represents a change in a direction of the gaze point.

As a result, an amount of change in the direction of the observation point of the driver when the on-vehicle acoustic apparatus 1 is mounted on the own vehicle (i.e., A curve) is larger than the amount of change when the on-vehicle acoustic apparatus 1 is not mounted on the own vehicle (i.e., B curve) and represents similar characteristics of the gaze point (i.e., X curve). This means that the observation point of the driver is led to the gaze point when the on-vehicle acoustic apparatus 1 is mounted on the own vehicle. As a result, for example, when the own vehicle is running on a curved road, the observation point of the driver is brought to a point further along the curved section of the curved road.

Figure 9:
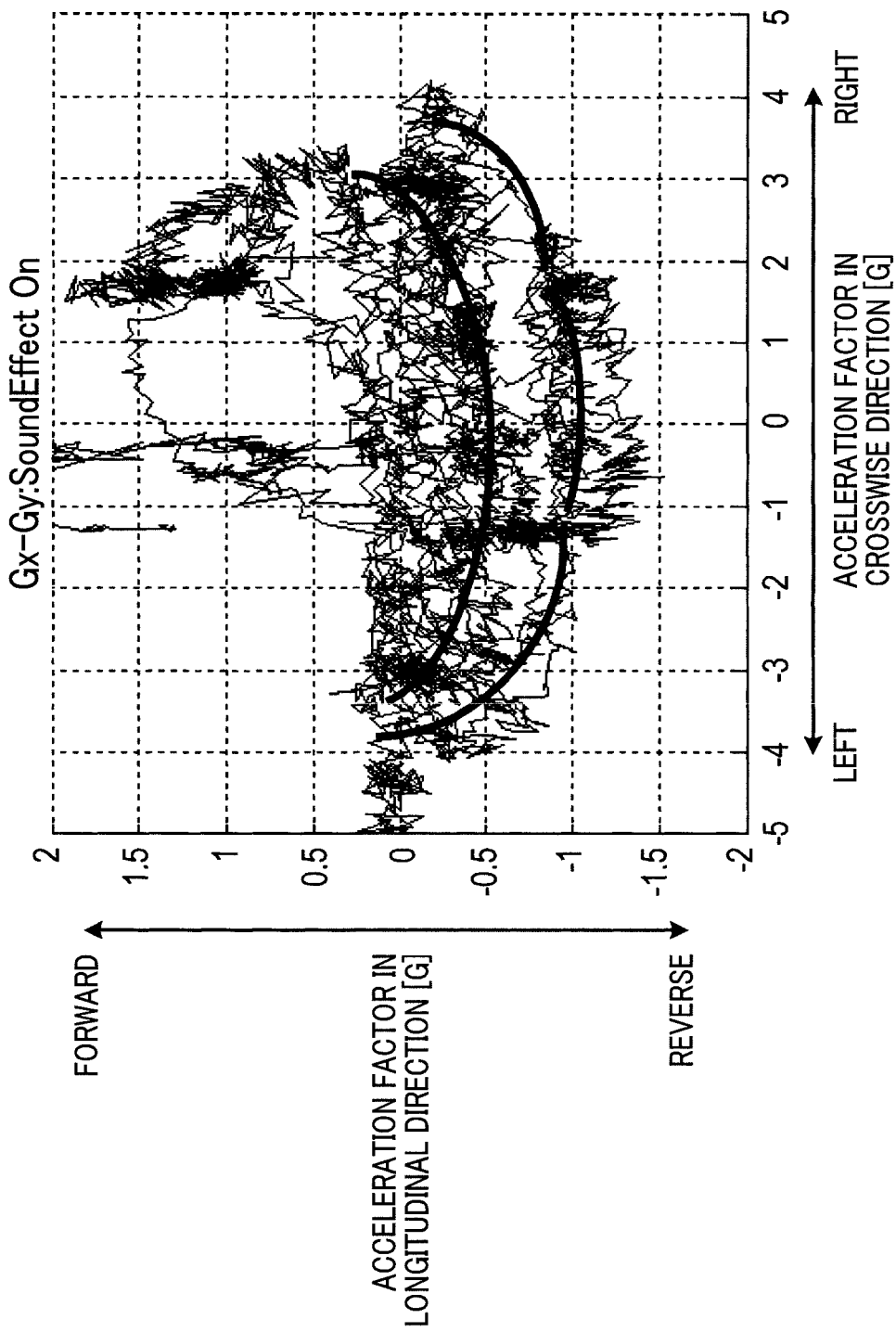
FIG. 9 is a graph showing an experiment result concerning an acceleration factor of a vehicle equipped with the on-vehicle acoustic apparatus.
Figure 10:
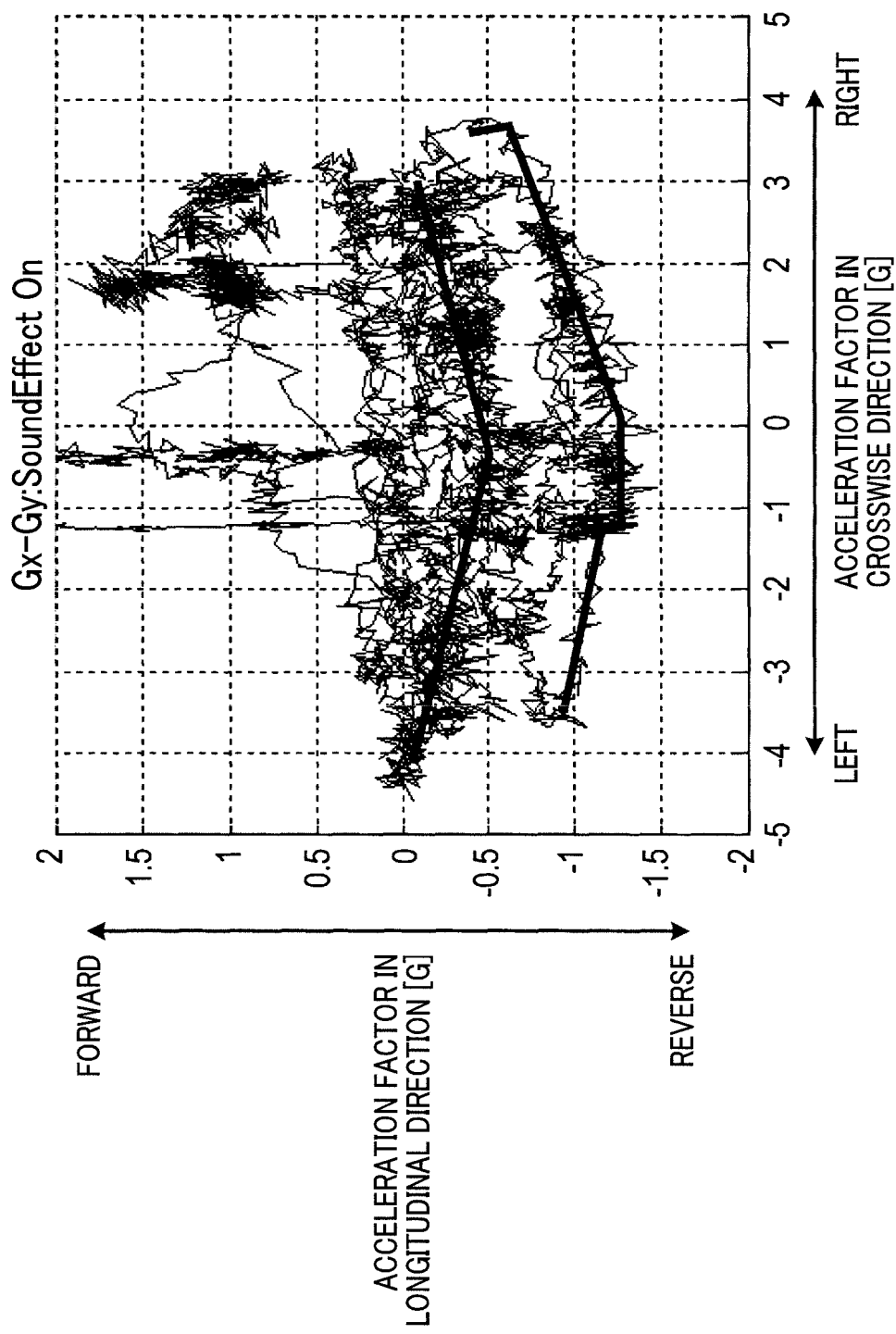
FIG. 10 is a graph showing an experiment result concerning an acceleration factor of a vehicle without the on-vehicle acoustic apparatus.

FIG. 9 is a graph showing a trend of an acceleration factor at longitudinal direction of the own vehicle (vertical axis) and a trend of an acceleration factor at crosswise direction of the own vehicle (horizontal axis), when the on-vehicle acoustic apparatus 1 is mounted on the own vehicle. Further, FIG. 10 is a graph showing a trend of an acceleration factor at longitudinal direction of the own vehicle and a trend of an acceleration factor at crosswise direction of the own vehicle, when the on-vehicle acoustic apparatus 1 is not mounted on the own vehicle. Comparing the trends as shown in FIGS. 9 and 10, the behavior of the acceleration factors as shown in FIG. 9 are continuously smoother than in the FIG. 10. Meanwhile, in the behavior as shown in FIG. 10, direction of the acceleration factor or an amount of the acceleration factor changes rapidly. According to the above-described results, the on-vehicle acoustic apparatus 1 can appropriately lead the driving operation of the driver.

Second Embodiment

The configuration and advantages of the on-vehicle acoustic apparatus 1 according to the second embodiment is the same as the one of the first embodiment. Hence, configurations identical to that of the first embodiment are labeled with the same reference numbers and explanation thereof is omitted. In the first embodiment, the on-vehicle acoustic apparatus 1 estimates a gaze point in which the location of the own vehicle, the running state of the own vehicle and the running environment of the own vehicle at a time when N seconds elapse from the present time are reflected. In the second embodiment, the on-vehicle acoustic apparatus 1 alternatively estimates a gaze point that reflects parameters at a time when the own vehicle reaches at a location with a predetermined distance away from the present location, including the location of the own vehicle, the running state of the own vehicle and the running environment of the own vehicle. In this case, at the step 4, the future vehicle behavior estimation system 7 calculates a curvature of the road at a location with a predetermined distance away from the present location. At the step 5, the future vehicle behavior estimation system 7 estimates the running state of the own vehicle (running speed V, yaw rate y) at the curvature estimated at the step 4. Moreover, at step 6, the future gaze point estimation system 9 virtually sets lattice points with constant intervals on the road 41 ahead of the own vehicle at a location with predetermined distance away from the present location and estimates the gaze point. According to the on-vehicle acoustic apparatus 1 of the second embodiment, similar effects of the one in the first embodiment can be obtained.

Third Embodiment

The configuration and advantages of the on-vehicle acoustic apparatus 1 according to the third embodiment is the same as the one of the first embodiment or the second embodiment. In the third embodiment, estimating method of the gaze point is different from that of the first embodiment and the second embodiment.

Figure 11:
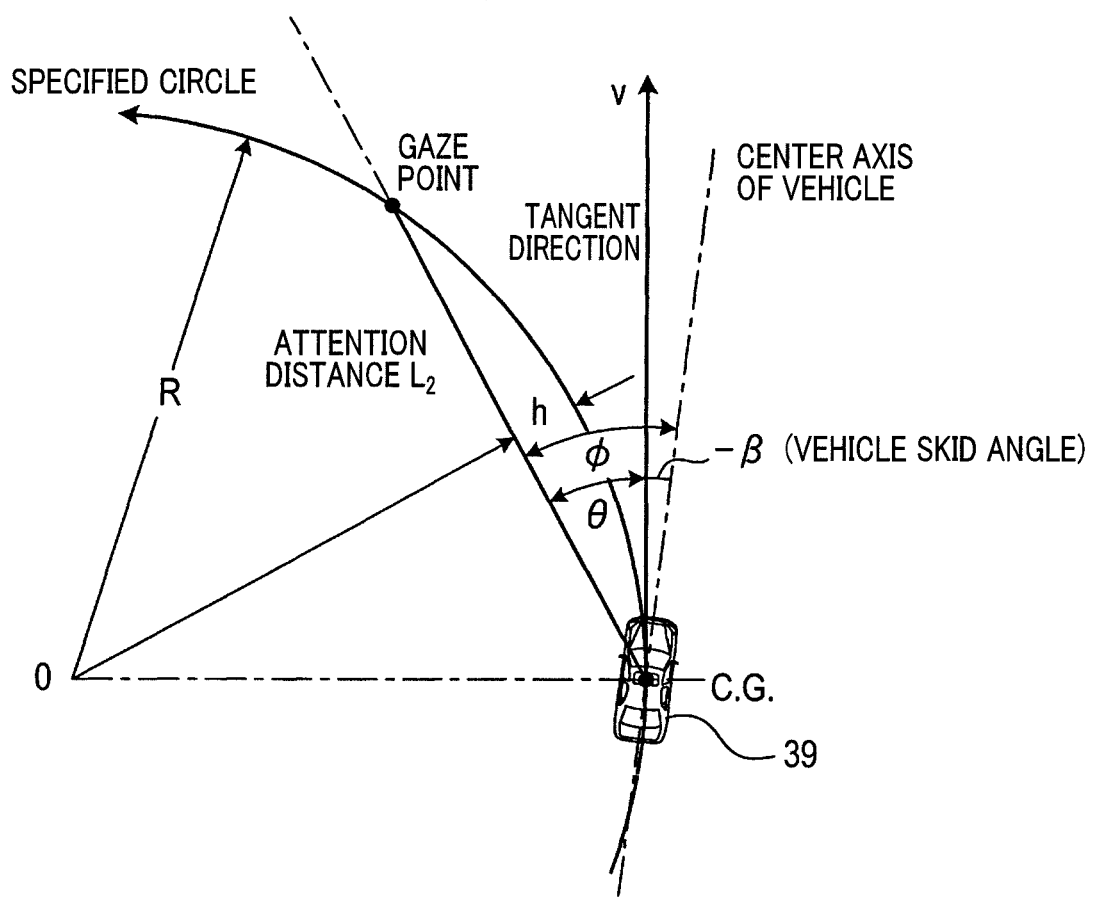
FIG. 11 is an explanatory diagram showing a method of estimating the gaze point by using look-ahead gaze point model.

According to the third embodiment, the gaze point is estimated by using a look-ahead gaze point model. With reference to FIG. 11, the look-ahead gaze point model is described as follows. FIG. 11 shows a situation where the own vehicle 39 exists on the road of which curvature is R, after N seconds elapse from the present time. The specified circuit in the FIG. 11 is a circle of which curvature is R corresponding to the road, being exist closely to the own vehicle 39. It is noted that tangent direction of the specified circle and the center axis of the vehicle (center line of the vehicle which is in parallel to the longitudinal direction thereof) make a vehicle skid angle 3. An attention distance $L_2$ is defined as a product of a margin time and the running speed of the own vehicle. A point on the circumference of the specified circle being exist with the attention distance $L_2$ away from the center of the vehicle is defined as a gaze point. This gaze point also reflects a location of the vehicle, a running state of the own vehicle (running speed V, yaw rate y) and the running environment of the own vehicle (curvature of the road).

According to the on-vehicle acoustic apparatus 1 of the third embodiment, similar advantages of the one in the first embodiment or the second embodiment can be obtained.

Fourth Embodiment

The configuration and the advantages of the on-vehicle acoustic apparatus 1 of the fourth embodiment are similar to that of first embodiment. However, unlike the future gaze point described in the first embodiment, according to the fourth embodiment, the gaze point is estimated at the present time and the sound image is localized to the gaze point.

In this case, at the above-described step 4, the on-vehicle acoustic apparatus 1 calculates the curvature of the road on which the own vehicle exists at the present time. Further, at the above-described step 5, the on-vehicle acoustic apparatus 1 estimates the running state (running speed V, yaw rate y) of the own vehicle at the present time. In this case, the yaw rate y can be estimated by using the gyro sensor 21 of the on-vehicle sensor system 5.

Furthermore, at the above-described step 6, the future gaze point estimation system 9 virtually sets lattice points with constant intervals on the road 41 ahead of the own vehicle at the present time and estimates the gaze point.

According to the on-vehicle acoustic apparatus 1 of the fourth embodiment, observation point of the driver can be led to an appropriate direction when driving the own vehicle as well. The present disclosure is not limited to those embodiments described above, and may include various types of modifications within the technical scope of the present disclosure.

For example, the gaze point can be estimated with other method as far as the gaze point reflects the location of the own vehicle, the running state of the own vehicle and the running environment of the vehicle. Even in this case, the gaze point should preferably be at a location where the driver should pay attention while driving the own vehicle.

The running environment of the own vehicle used for determining the gaze point is not limited to the curvature of the road. For example, the running environment includes locations of other vehicles, running direction of other vehicles, running speed of other vehicle, a condition of the road (e.g. an obstacle on the road, an icy road, a puddle on the road, road covered with snow, cracks in the road, uneven road features etc.), weather conditions including rain, snow, fog and temperature and brightness outside the own vehicle.

What is claimed is:
1. An acoustic apparatus mounted on a vehicle driven by a driver comprising:
   acquiring means for acquiring a gaze point at which the driver gazes while driving the vehicle, the gaze point reflecting parameters including a location of the vehicle, a running state of the vehicle, and a running environment of the vehicle, and acquiring a future gaze point existing at a future time, the future gaze point reflects the parameters at a time delayed by a predetermined period from a time when the gaze point is acquired or the parameters at a time when the vehicle reaches a location a predetermined distance away from a location where the gaze point was acquired;
   generation means for generating sound images in the vehicle; and
   localization means for localizing the sound images to be at the gaze point and at the future gaze point.
2. The acoustic apparatus according to claim 1, wherein the acoustic apparatus further includes selecting means for selecting a sound source used for the sound image from among a plurality of sound sources.

3. An acoustic apparatus mounted on a vehicle driven by a driver comprising:
   a recognition device that recognizes an environmental information surrounding the vehicle;
   a sensor device that detects a present running state of the vehicle at a present time, including running speed of the vehicle and a yaw rate of the vehicle;
   a first estimator that estimates a future running state of the vehicle which is a running state of the vehicle after predetermined period elapse from the present time, based on the environmental information and the present running state of the vehicle;
   a second estimator that estimates a gaze point at a time after a predetermined period elapses from the present time, based on the future running state and the environmental information;
   an audio processor that determines a transfer function used for generating a sound image to be localized to the gaze point estimated by the second estimator; and
   an audio system that generates sound image based on the transfer function determined by the audio processor.

4. The acoustic apparatus according to claim 3, wherein the second estimator estimates a future gaze point existing at a future time and localize the sound image to be at the future gaze point.

5. The acoustic apparatus according to claim 4, wherein the future gaze point reflects parameters including a location of the vehicle, a running state of the vehicle and a running environment of the vehicle, at a time delayed by a predetermined period from a time when the gaze point is estimated.

6. An acoustic apparatus mounted on a vehicle driven by a driver comprising:
   an acquiring unit that includes a CPU and a memory unit, and that is configured to acquire a gaze point at which the driver gazes while driving the vehicle, the gaze point reflecting parameters including a location of the vehicle, a running state of the vehicle and a running environment of the vehicle, and that is adapted to acquire a future gaze point existing at a future time, the future gaze point reflects the parameters at a time delayed by a predetermined period from a time when the gaze point is acquired or the parameters at a time when the vehicle reaches a location a predetermined distance away from a location where the gaze point was acquired;
   a generation unit that includes a plurality of speakers, and that is configured to generate sound images in the vehicle;
   a localization unit that is configured to localize the sound images to be at the gaze point and at the future gaze point, and that includes an audio processor configured to determine transfer functions that generates the sound images to be localized at the gaze point and the future gaze point; and
   a sound source selecting unit configured to select sound sources used for the sound images from among a plurality of sound sources.

7. An acoustic apparatus mounted on a vehicle driven by a driver comprising:
   a recognition device that includes at least one camera, and that is configured to recognize an environmental information surrounding the vehicle;
   a sensor device that includes a plurality of sensors, and that is configured to detect a present running state of the vehicle at a present time, including running speed of the vehicle and a yaw rate of the vehicle;
   a first estimator that includes a first CPU and a first memory unit, and that is configured to estimate a future running state of the vehicle which is a running state of the vehicle after predetermined period elapse from the present time, based on the environmental information and the present running state of the vehicle;
   a second estimator that includes a second CPU and a second memory unit, and that is configured to estimate a gaze point at a time after a predetermined period elapses from the present time, based on the future running state and the environmental information;
   an audio processor that is configured to determine a transfer function used for generating a sound image to be localized to the gaze point estimated by the second estimator; and
   an audio system that includes a plurality of speakers, and that generates sound image based on the transfer function determined by the audio processor.

8. The acoustic apparatus according to claim 7, wherein the second estimator is configured to estimate a future gaze point existing at a future time and to localize the sound image to be at the future gaze point.

9. The acoustic apparatus according to claim 8, wherein the future gaze point reflects parameters including a location of the vehicle, a running state of the vehicle and a running environment of the vehicle, at a time delayed by a predetermined period from a time when the gaze point is estimated.

10. The acoustic apparatus according to claim 7, wherein the sensor device includes at least one wheel speed sensor and at least one gyro sensor.

11. The acoustic apparatus according to claim 7, wherein the recognition device further includes a GPS navigation system.

* * * * *